(12) United States Patent
Smith et al.

(10) Patent No.: US 9,658,476 B2
(45) Date of Patent: *May 23, 2017

(54) CONTROLLING BIAS VOLTAGES FOR OPTICAL MODULATORS

(71) Applicant: BAE SYSTEMS plc, London (GB)

(72) Inventors: Andrew James Smith, Chelmsford (GB); Mohammed Nawaz, Chelmsford (GB); Simon Charles Giles, Chelmsford (GB)

(73) Assignee: BAE SYSTEMS plc, London (GB)

( * ) Notice: Subject to any disclaimer, the term of this patent is extended or adjusted under 35 U.S.C. 154(b) by 229 days.

This patent is subject to a terminal disclaimer.

(21) Appl. No.: 14/398,241

(22) PCT Filed: Apr. 30, 2013

(86) PCT No.: PCT/GB2013/051112
§ 371 (c)(1),
(2) Date: Oct. 31, 2014

(87) PCT Pub. No.: WO2013/164603
PCT Pub. Date: Nov. 7, 2013

(65) Prior Publication Data
US 2015/0110436 A1    Apr. 23, 2015

(30) Foreign Application Priority Data

May 2, 2012 (EP) ..................................... 12275057
May 2, 2012 (GB) ................................... 1207668.3

(51) Int. Cl.
*G02F 1/01* (2006.01)
*G02F 1/225* (2006.01)
*G02F 1/21* (2006.01)

(52) U.S. Cl.
CPC ............ *G02F 1/0123* (2013.01); *G02F 1/225* (2013.01); *G02F 1/2255* (2013.01); *G02F 2001/212* (2013.01)

(58) Field of Classification Search
CPC ...... G02F 1/0123; G02F 1/225; G02F 1/2255; G02F 2001/212
See application file for complete search history.

(56) References Cited

U.S. PATENT DOCUMENTS

| 8,160,456 B2* | 4/2012 | Smith | G02F 1/0123 398/195 |
| 9,291,835 B2* | 3/2016 | Smith | G02F 1/0123 |
| 2015/0110437 A1* | 4/2015 | Smith | H04B 10/50595 385/2 |

FOREIGN PATENT DOCUMENTS

| EP | 2333915 A1 | 6/2011 |
| WO | 02063381 A1 | 8/2002 |

(Continued)

OTHER PUBLICATIONS

International Search Report and Written Opinion received for Patent Application No. PCT/GB2013/051112, mailed on Jun. 21, 2013. 9 pages.

(Continued)

*Primary Examiner* — Daniel Petkovsek
(74) *Attorney, Agent, or Firm* — Finch & Maloney PLLC

(57) ABSTRACT

Methods and apparatus for controlling a bias voltage supplied to an optical modulator, the modulator comprising a biasable component, the biasable component being configurable to be biased by application of the bias voltage (20) such that the modulator operates at quadrature, the method comprising: providing a target for the output power of the modulator, the target for the output power of the modulator being an output power corresponding to the modulator operating at quadrature; applying, to the biasable compo- (Continued)

nent, a bias voltage (20) having an initial value of 0V; and, thereafter, varying the bias voltage (20) until the value of the bias voltage (20) is the value that is closest to the initial value and that biases the biasable component so that the output power of the modulator is within a pre-defined range of the target output power.

19 Claims, 7 Drawing Sheets

(56) References Cited

FOREIGN PATENT DOCUMENTS

| | | |
|---|---|---|
| WO | 2008059198 A1 | 5/2008 |
| WO | 2013164603 A1 | 11/2013 |

OTHER PUBLICATIONS

GB Intellectual Property Office Search Report under Section 17(5) received for GB Patent Application No. 1207668.3, mailed Sep. 19, 2012. 3 pages.
European Patent Office Search Report received for EP Patent Application No. 12275057.3, mailed Sep. 10, 2012. 3 pages.
International Preliminary Report on Patentabilty for PCT/GB2013/051112. Date of mailing: Jul. 18, 2014. 7 pages.

\* cited by examiner

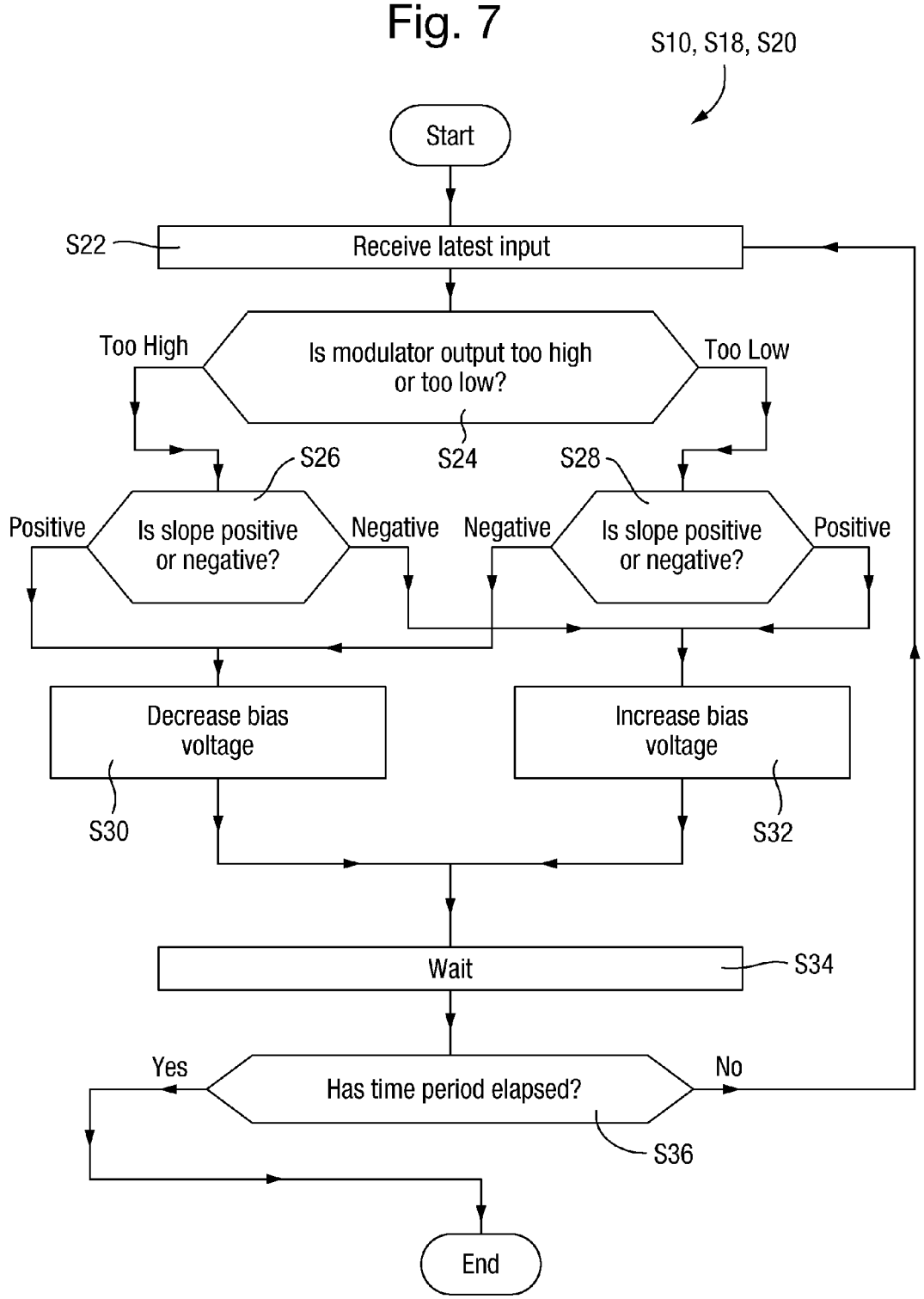

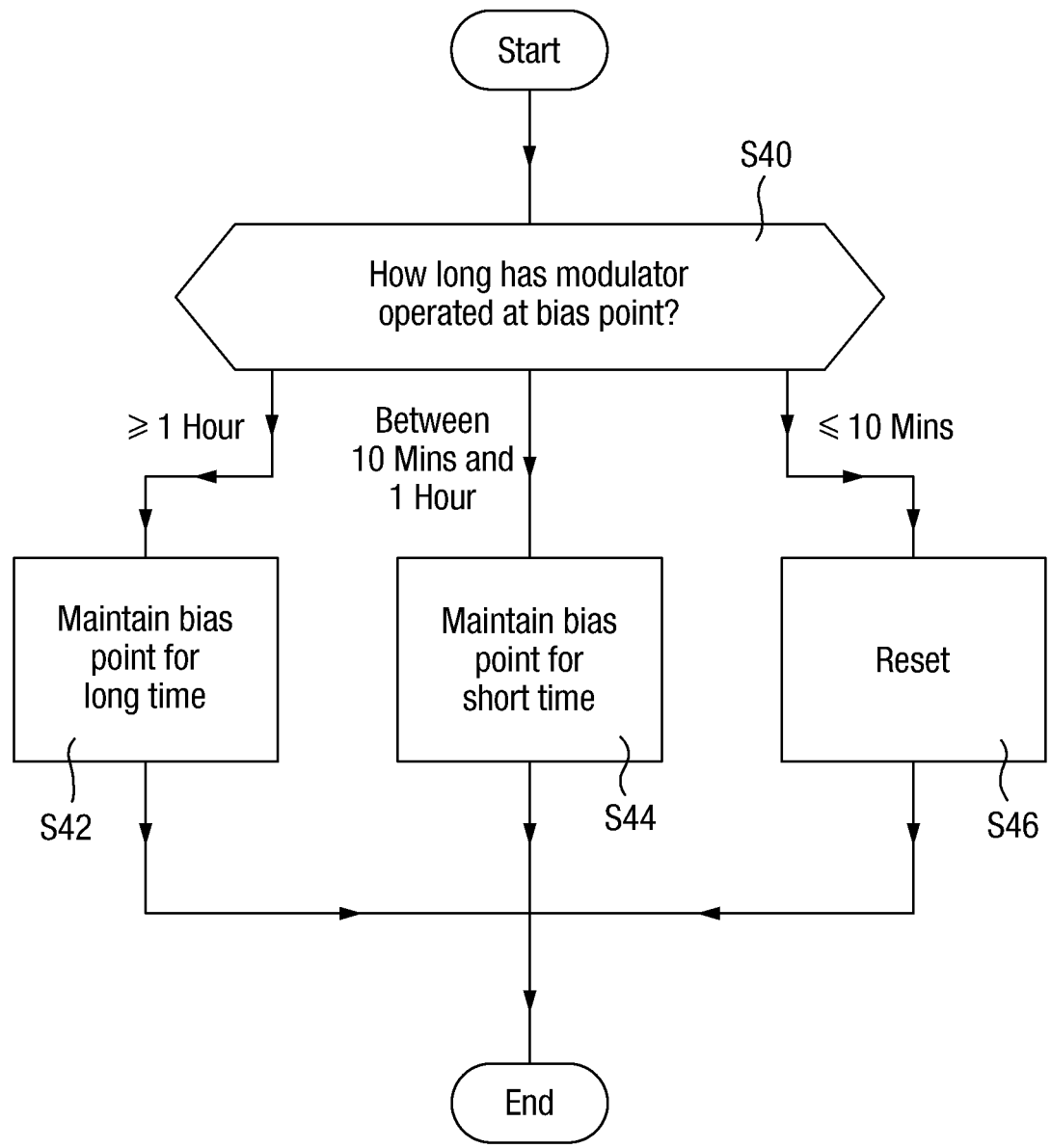

CONTROLLING BIAS VOLTAGES FOR OPTICAL MODULATORS

FIELD OF THE INVENTION

The present invention relates to controlling bias voltages supplied to optical modulators.

BACKGROUND

The use of bias controllers and (e.g. Mach-Zehnder (MZ)) modulators in communications systems is known. Controllers and modulators may be used to modulate an input optical carrier signal with a radio frequency (RF) communications signal.

FIG. 1 is a schematic illustration (not to scale) of an MZ modulator 1.

The MZ modulator 1 provides a mechanism whereby an input optical carrier signal may be modulated with a communications signal, for example with an RF communications signal. In this example the modulator is effectively an interferometer, created by forming an optical waveguide in a suitable substrate such as Lithium Niobate (LiNbO3) or Gallium Arsenide (GaAs) or Indium Phosphide (InP).

A waveguide 11 of the MZ modulator 1 is split into two branches 11a, 11b before recombining at an optical coupler 13. An optical carrier signal in the form of a beam of light enters one side of the modulator 1 (as indicated by an arrow at the left-hand side of FIG. 1) and exits the modulator 1 at the opposite side (i.e. at the right-hand side of FIG. 1) having passed through both branches 11a, 11b of the waveguide 11.

One of the waveguide branches 11a includes an asymmetry 15 that functions to introduce a phase difference between light travelling down respective branches 11a, 11b of the waveguide 11. The phase difference is chosen to be approximately 90 degrees at the wavelength of operation, which is typically in the region of 1300 or 1550 nanometers. This induces quadrature bias where the optical output is nominally 50% of its maximum.

Lithium Niobate (in common with other similar materials such as GaAs or InP) is a glass-like material with a crystal structure that exhibits an electro-optic effect whereby the refractive index of the crystal structure changes as a voltage is applied thereto. In particular, the direction of the electric field induced by the applied voltage causes an increase or decrease in refractive index. An increased refractive index acts so as to slow light travelling through the crystal, and a decreased refractive index acts so as to increase the speed of light travelling through the crystal. In MZ modulators, the Lithium Niobate material is usually arranged so as to have an X cut, Y propagate crystal orientation with respect to the input optical signal, and in this context an electric field applied in the X direction (positive or negative) causes a change in the refractive index of the material that affects the speed of the light passing along the Y axis.

As shown in FIG. 1, a modulating electrode 7 is provided between the branches 11a, 11b of the waveguide 11. When the modulating electrode 7 is energised by an applied signal (e.g. a radio frequency or digital communications signal), positive and negative electric fields are established between the modulating electrode 7 and, respectively, a first 3 and a second 5 ground plane. The modulating electrode 7 is designed as a transmission line so that the modulating signal travels with the optical carrier signal through the MZ modulator 1, thereby enabling high modulating frequencies to be achieved.

The positive and negative electric fields cause the refractive index of the two branches 11a, 11b of the waveguide 11 to change (the positive field causing an increase in refractive index for branch 11a, and the negative field causing a decrease in refractive index for branch 11b), and the resulting different propagation speeds of the optical carrier signal through each branch cause a change in phase in the signals output to the optical combiner 13, which phase change causes the output level of light from the optical combiner 13 to change. In effect, as the electric fields experienced by each branch varies with the communications signal applied to the modulating electrode 7, so the phase difference between light passing through the two branches changes and the output level of the optical signal output from the combiner 13 varies accordingly. The net effect of this is that the input optical carrier signal is modulated with the communications signal applied to the modulating electrode 7.

FIG. 2 is a schematic illustration (not to scale) showing a modulator transfer function. This transfer characteristic of the MZ modulator 1 is approximately sinusoidal. The most linear modulation tends to be achieved in and around the quadrature point (also known simply as "quadrature"). The quadrature point is the point where there is a 90 degree phase relationship between light travelling through respective branches 11a, 11b of the waveguide 11. The transfer function is a repeating function, and as such there are many quadrature points at different bias voltages but all with the same power output. Indicated in FIG. 2 by the reference sign A is a first quadrature point. At this first quadrature point A the output power is increasing with bias voltage, and hence this quadrature point A is referred to as a positive slope quadrature bias point. Indicated in FIG. 2 by the reference signs B and C are two further quadrature points B and C where the output power is decreasing with bias voltage. These quadrature points B, C are each referred to as negative slope quadrature bias points.

In practice, the preferred 90 degree phase shift is rarely, if ever, achieved. To compensate for this, it is usual to include a biasable component 9, and to apply a DC bias voltage to the biasable component 9, to return the MZ modulator 1 to or near to one of the aforementioned quadrature points. In the arrangement depicted in FIG. 1, the biasable component 9 comprises a discrete bias electrode (this is merely illustrative as a number of alternative arrangements are known to persons skilled in the art). For example, a bias voltage may be applied directly to the modulating electrode 7 by means of a so-called bias-Tee. In such an arrangement, the DC bias is coupled to the electrode via an inductor, and the applied signal (for example an RF communications signal) is coupled to the electrode via a capacitor.

A problem with this arrangement is that the bias point, i.e. the voltage that needs to be applied to the biasable component 9 to return the MZ modulator 1 to or near the quadrature point, shifts over time. For example, so-called trapped charges (e.g. that exist in the regions between electrodes, e.g. in a silicon dioxide buffer layer on the surface of the device) and temperature variations can each cause the bias point to shift at a rate of anything from a few millivolts per hour to several volts per hour. Thus, conventionally it tends not to be possible to provide a system where the bias voltage, once set, need not be changed. As such it is usual to provide some sort of dynamic bias control to enable modulator linearity to be maintained over an extended period of time.

In the analogue domain, dynamic bias control has previously been achieved by applying a pilot tone (for example a 10 kHz tone for a multi-GHz communications signal of interest) to the modulating electrode, by monitoring the output of the modulator and by adjusting the bias voltage based on that output. For example, as the $2^{nd}$ harmonic of the pilot tone usually tends to be minimal at or around the quadrature point, one previously proposed approach monitors this second harmonic and adjusts the applied DC bias voltage to minimise the second harmonic. A similar approach has previously been proposed for the digital domain, but in this instance the signal applied is typically a square wave dither signal, and the output is monitored by a digital signal processor.

Whilst each of these approaches do enable a form of dynamic bias control to be provided, they each have attendant disadvantages. For example, the application of a pilot tone necessarily gives rise to modulation products (for example sidebands) that limit the performance of the system, and for high-fidelity optical links this reduction in performance is unacceptable. In very high-speed links (for example, digital links with speeds of up to 100 GBit/s and analogue links with frequencies of up to 60 GHz), the application of a dither can adversely affect the achievable data rate and the length of link that is achievable. Another disadvantage particularly prevalent in instances where multiple channels are required, for example in a phased array antenna system, is that as each modulator is different the bias control hardware needs to be fully replicated for each and every modulator. This increases system bulk, complexity and cost.

WO 2008/059198 discloses a bias controller for an optical modulator. The modulator includes a bias electrode that is operable when appropriately biased by an applied bias voltage to configure the modulator to operate at quadrature. The bias controller comprises means for generating power signals indicative of the optical output power of the modulator, and a processor operably connected to the generating means and the bias electrode. The processor is arranged to receive the power signals from the generating means and to control the bias voltage applied to the bias electrode. The processor is configured to vary the bias voltage applied to the bias electrode and to determine (from power signals received from the generating means) a peak optical output power for the modulator. The processor is further configured to determine, in dependence upon the peak optical power, a target optical power for quadrature with reference to a store of predetermined values for peak output power and respective corresponding values of target optical power for quadrature.

SUMMARY OF THE INVENTION

In a first aspect, the present invention provides a method of controlling a bias voltage supplied to an optical modulator, the modulator being configurable to be biased by application of the bias voltage such that the modulator operates at quadrature, the method comprising: providing a target for the output power of the modulator, the target for the output power of the modulator being an output power corresponding to the modulator operating at quadrature, applying, to the modulator, a bias voltage having an initial value of 0V, and thereafter, varying the bias voltage until the value of the bias voltage is the value that is closest to the initial value and that biases the modulator so that the output power of the modulator is within a pre-defined range of the target output power.

The method may further comprise monitoring the output power of the modulator and, if the output power of the modulator is determined to be outside the pre-defined range of the target output power, further varying the value of the bias voltage so as to bring the output power of the modulator back to being within the pre-defined range of the target output power.

The step of further varying the value of the bias voltage so as to bring the output power of the modulator back to being within the pre-defined range of the target output power may comprise: comparing the output power of the modulator to the target output power to determine whether the output power of the modulator is either higher or lower than the pre-defined range of the target output power, determining a direction of a slope of the output power of the modulator relative to the applied bias voltage, and depending on the determined slope direction and whether the output power of the modulator is either higher or lower than the pre-defined range of the target output power, either increasing or decreasing the bias voltage by a predetermined amount.

The size of the predetermined amount that bias voltage is either increased or decreased by may be dependent upon how long the modulator has been operating at quadrature.

The step of varying the bias voltage may comprise comparing the output power of the modulator to the target output power to detect when the output power of the modulator is within the pre-defined range of the target output power.

Comparing the output power of the modulator to the target output power may be performed either using a window comparator, or using an analogue to digital converter and digital processing means.

The step of varying the bias voltage may comprise, starting at the initial value, sweeping the bias voltage in a zigzag pattern with gradually increasing amplitude.

The zigzag pattern may be an asymmetric zigzag pattern.

The output power of the modulator may be within a pre-defined range of the target output power if the output power of the modulator is substantially equal to the target output power.

The target output power may be provided by means of a potentiometer or a digital-to-analogue converter.

The step of varying the bias voltage may be performed such that the bias voltage is confined to being within a pre-defined bias voltage range.

The method may further comprise, if it is determined that an optical input to the optical modulator has been disabled, maintaining the bias voltage at its current level for a predetermined length of time, the predetermined length of time being dependent upon the length of time that the modulator has been operating at quadrature.

In a further aspect, the present invention provides a method of controlling a modulating unit for an optical communications system, the modulating unit comprising a laser for generating an optical carrier signal, an optical modulator for modulating the optical carrier signal, the optical modulator being configurable to be biased by application of a bias voltage such that the optical modulator operates at quadrature, the method comprising controlling the bias voltage supplied to the optical modulator using a method according to the first aspect.

In a further aspect, the present invention provides a bias controller for an optical modulator, the modulator being configurable to be biased by application of a bias voltage such that the modulator operates at quadrature, the bias controller comprising one or more processors configured to: provide, for application to the modulator, the bias voltage, the bias voltage having an initial value of 0V, and dependent upon a target for the output power of the modulator, vary the bias voltage until the value of the bias voltage is the value that is closest to the initial value and that biases the modulator so that the output power of the modulator is within a pre-defined range of the target output power, wherein the target for the output power of the modulator is an output power corresponding to the modulator operating at quadrature.

In a further aspect, the present invention provides a modulating unit for an optical communications system, the unit comprising a laser for generating an optical carrier signal, an optical modulator for modulating the optical carrier signal, and a bias controller according to the above aspect and arranged to control the optical modulator.

In a further aspect, the present invention provides a computer program or plurality of computer programs arranged such that when executed by a computer system it/they cause the computer system to operate in accordance with the method of any of the above aspects.

In a further aspect, the present invention provides a machine readable storage medium storing a computer program or at least one of the plurality of computer programs according to the above aspect.

BRIEF DESCRIPTION OF THE DRAWINGS

FIG. 7 is a process flow chart of an example tracking or chase process;

FIG. 9 is a process flow chart showing certain steps of a process that may be performed by the bias controller if a laser is disabled.

DETAILED DESCRIPTION

Preferred embodiments of the present invention will be described hereafter with particular reference to a bias controller for a modulator. Such controllers and modulators are typically employed in communications systems to modulate an input optical carrier signal with a radio frequency (RF) communications signal. Whilst the teachings of the present invention have great utility in optical communications systems, i.e. communications systems where the nodes of the system are optically connected, it will be immediately appreciated by persons of ordinary skill in the art that the teachings of the invention may otherwise be applied. Accordingly, the following illustrative description should not be read as being limited solely to communications systems.

Figure 3:
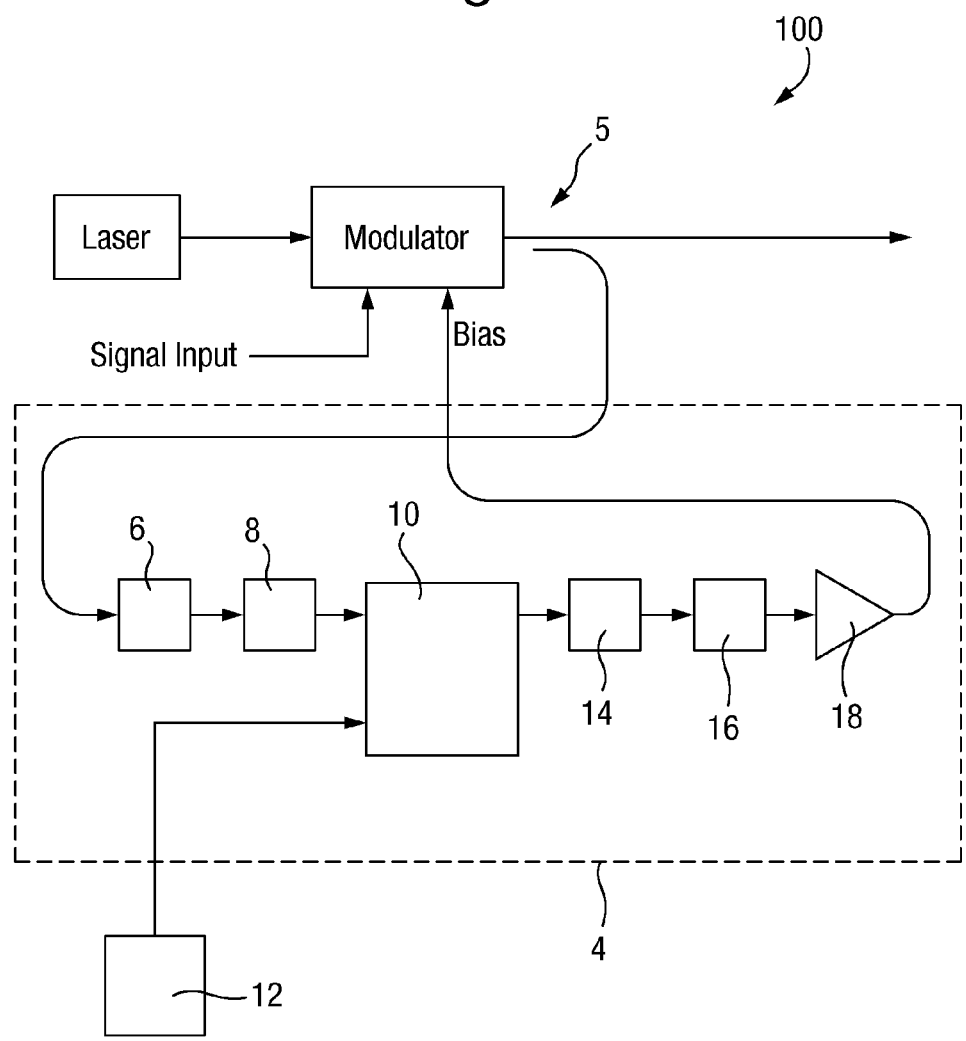
FIG. 3 is a schematic illustration (not to scale) of a first example network in which an embodiment of a bias controller is implemented.

FIG. 3 is a schematic illustration (not to scale) of a first example network 100 in which an embodiment of a bias controller 4 is implemented.

Figure 1:
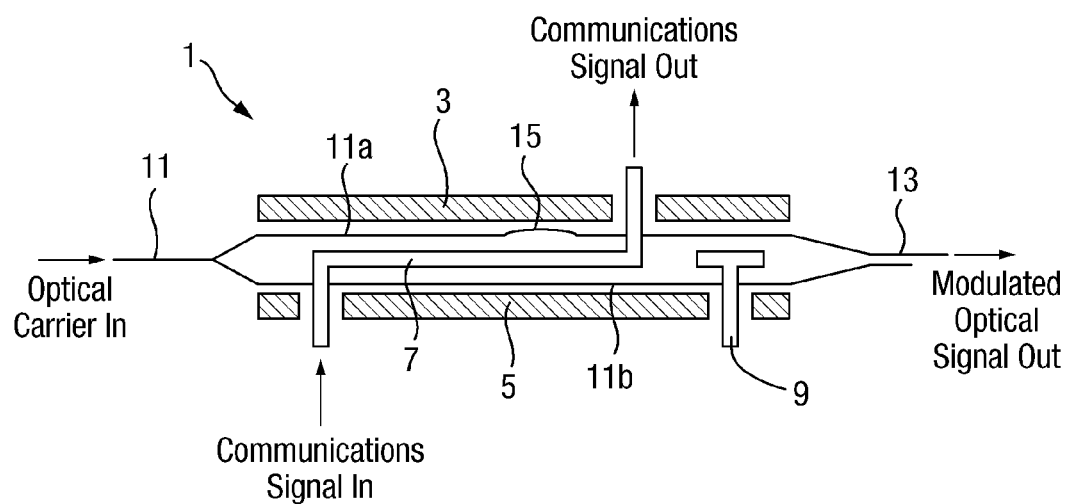
FIG. 1 is a schematic illustration (not to scale) of an MZ modulator.
Figure 2:
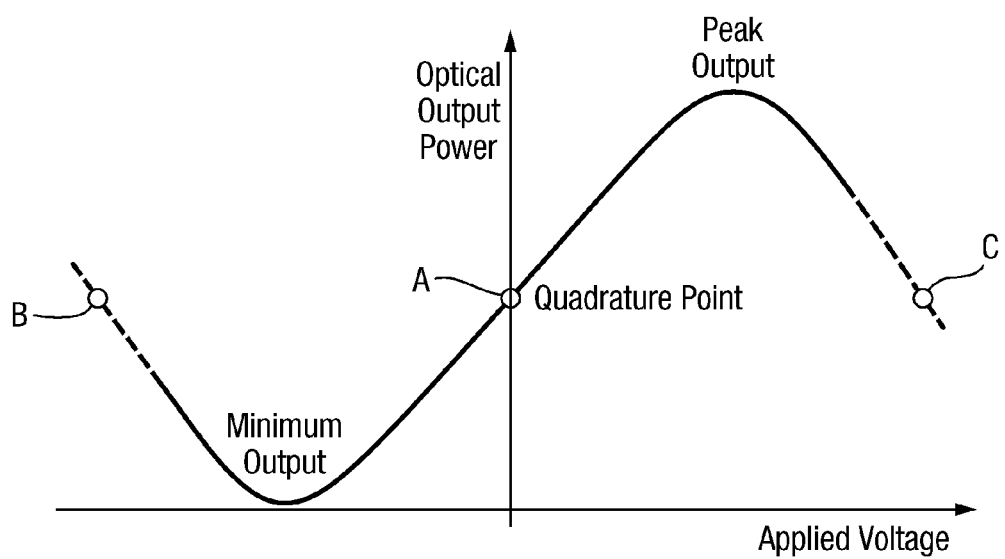
FIG. 2 is a schematic illustration (not to scale) of a modulator transfer function.

In the first network 100, the bias controller 4 is coupled to a modulator, e.g. an MZ modulator of the type depicted in FIG. 1. The modulator in FIG. 3 is driven by a continuous wave laser that is operable to provide an optical carrier signal with which a communications signal (such as an RF communications signal) is to be modulated. In this example, the modulator includes a separate bias electrode, however other arrangements are possible.

The bias controller 4 comprises a photodiode 6 that is coupled to the modulator output by means of an optical tap coupler 5. The optical tap coupler 5 is operable to monitor the optical signal output of the modulator and pass approximately 1 to 5% of that output to the photodiode 6. The photodiode 6 and coupler 5 may be combined in a single unit (for example the unit may comprise a partially reflective mirror and may be arranged so that light enters the unit via a first fibre and most (e.g. 95%) is reflected into another fibre; a proportion of that light (e.g. 5%) being transmitted through the mirror to be incident upon the photodiode 6). As an alternative, the photodiode 6 may be integrated into the modulator i.e. in other embodiments, the bias controller 4 does not comprise a photodiode 6 which is instead integrated with the modulator. An integrated photodiode may be arranged to capture an evanescent field from the output waveguide, or alternatively may be arranged to face the end of the modulator so as to capture light output from a dump port of the modulator. Use of an integrated photodiode advantageously tends to minimise output losses. Furthermore, if the integrated photodiode is arranged to capture light output from a dump port of the modulator, the photodiode tends to be exposed to a much higher optical input. Thus, a need for subsequent sensitive detection circuitry tends to be reduced or eliminated.

The photodiode 6 is reverse-biased. Light incident on the photodiode 6 is converted to current, proportional to the incident light. The photodiode 6 is a relatively large area, low bandwidth device, which prevents it from detecting the radio frequency (RF) component of the modulated signal. Thus, the photodiode 6 advantageously tends only to return the direct current (DC) component of the signal.

The output of the photodiode 6 is coupled to a resistor 8. The resistor 8 converts current (passed to the resistor 8 from the photodiode 6) to a voltage. The resistor 8 tends to advantageously provide a relatively simple and cheap means of converting current to voltage. In other embodiments, such conversion may be performed by different means, e.g. a transimpedance amplifier. This would tend to provide higher sensitivity than a resistor, thereby allowing for smaller amounts of optical power to be tapped off from the modulator output.

The output of the resistor 8 is coupled to a window comparator 10. In other words, an input of the window comparator 10 is the voltage supplied by the resistor 8. A further input of the window comparator 10 is a voltage supplied by a potentiometer 12. The potentiometer 12 supplies a voltage, for use as a target voltage, to the window comparator 10. The target voltage supplied by the potentiometer is a signal that is indicative of a target optical power for the modulator for quadrature. In other embodiments, the target voltage may be set by a different means. For example, the target voltage may be set using a digital-to-analogue converter (DAC). This would tend to advantageously allow for remote adjustment of the bias point of the modulator. Also for example, the target voltage could take a fixed value, e.g. if the resistor 8 was a variable resistor.

The window comparator 10 compares the voltage supplied by the resistor 8 against the target voltage supplied by the potentiometer 12. This is done to determine whether the reference voltage (i.e. the voltage supplied by the resistor 8)

is "too high", "too low", or "acceptable" relative to the target voltage. The terminology "acceptable" may, for example, be used to refer to reference voltages within 1% of the target voltage. The terminology "too high" may, for example, be used to refer to reference voltages that are greater than or equal to the target voltage plus 1%. The terminology "too low" may, for example, be used to refer to reference voltages that are less than or equal to the target voltage minus 1%. The use of a window comparator 10 in performing the aforementioned comparison advantageously tends to alleviate problems caused by oscillations in the bias voltage (e.g. that may occur when the reference voltage is repeatedly adjusted to be too high, then too low etc.) that may result if, for example, a single point comparator were used. Nevertheless, in other embodiments, a single point comparator or other type of comparator may be used to compare the reference and target voltages.

The output of the window comparator 10 is coupled to a processor 14. An output of the window comparator 10 may be an indication as to whether the reference voltage is too high, too low or acceptable relative to the target voltage. In other embodiments, the result of the comparison of the reference and target voltages may be indicated to the processor 14 in a different way. For example, if the reference voltage is either too high or too low in relation to the target voltage, the window comparator 10 may send a corresponding signal to the processor 14 informing the processor 14 that the reference voltage is either too high or too low, whereas if the reference voltage is within an acceptable range of the target voltage, no such indication would be sent. Thus, the processor 14 is able to ascertain, using the output of the window comparator 10, whether the reference voltage is too high, too low or adequate relative to the target voltage.

In this embodiment, the processor 14 is a Field Programmable Gate Array (FPGA). In other embodiments, the processor 14 is a different type of processor, e.g. a Complex Programmable Logic Device (CPLD), Microcontroller, Digital Signal Processor (DSP) etc.

The processor 14 is configured to perform a control algorithm using the output of the window comparator 10. An embodiment of the control algorithm used by the processor 14 is described in more detail later below with reference to FIG. 5. The control algorithm is performed to, using the output of the window comparator 10, set and/or adjust a bias voltage supplied to the modulator until the modulator reaches a quadrature point (or other bias point). The bias voltage is supplied to the modulator by the processor 14 by means of a digital to analogue convertor (DAC) 16 and an amplifier 18. The DAC 16 may be, for example, a single-ended (positive output only) device. The amplifier 18 may introduce an offset voltage to allow for the generation of negative as well as positive bias voltages.

The processor 14 may additionally be connected to a host system (not shown in the Figures). This connection may be such that information may be sent between the processor 14 and the host system. For example, the processor 14 may report, to the host system, the state of the laser and/or indicate the value of the bias voltage supplied by it to the modulator. Also for example, the host system may send instructions to the processor 14, e.g. an instruction that the processor 14 should "reset" the bias voltage to its initial, i.e. starting value, e.g. 0V. The host system may, for example, be a health monitoring system, or an overall control system for a radar system. Also, as described in more detail later below, the host system may be configured to take control of if/when the bias voltage is adjusted.

Figure 4:
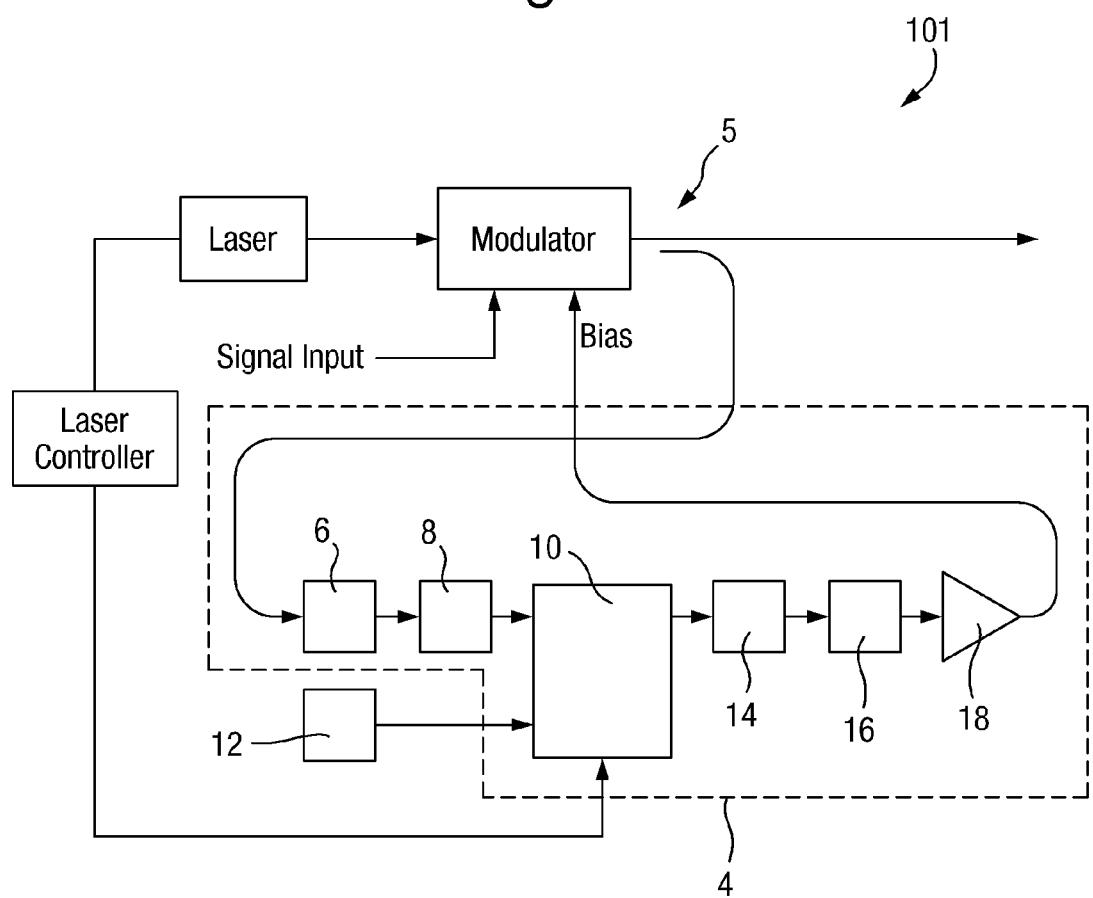
FIG. 4 is a schematic illustration (not to scale) of a second example network in which the bias controller is implemented.

FIG. 4 is a schematic illustration (not to scale) of a second example network 101 in which the bias controller 4 is implemented.

In this further embodiment, the laser, modulator, bias controller 4, and optical tap coupler 5 are arranged as described above with reference to FIG. 1. The second network 101 additionally comprises a laser controller for controlling the laser. In addition to being operatively coupled to the laser, the laser controller is coupled to processor 14 such that signals indicative of the state of the laser may be sent from the laser controller to the processor 14. Using these signals, the processor 14 may, for example, determine when the laser has been enabled/disabled, when the laser power has stabilised etc. The processor 14 may relay information relating to the status of the laser to remote systems or apparatus (e.g. the host system).

Apparatus, including the processor 14, for implementing any of the above arrangements, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Figure 5:
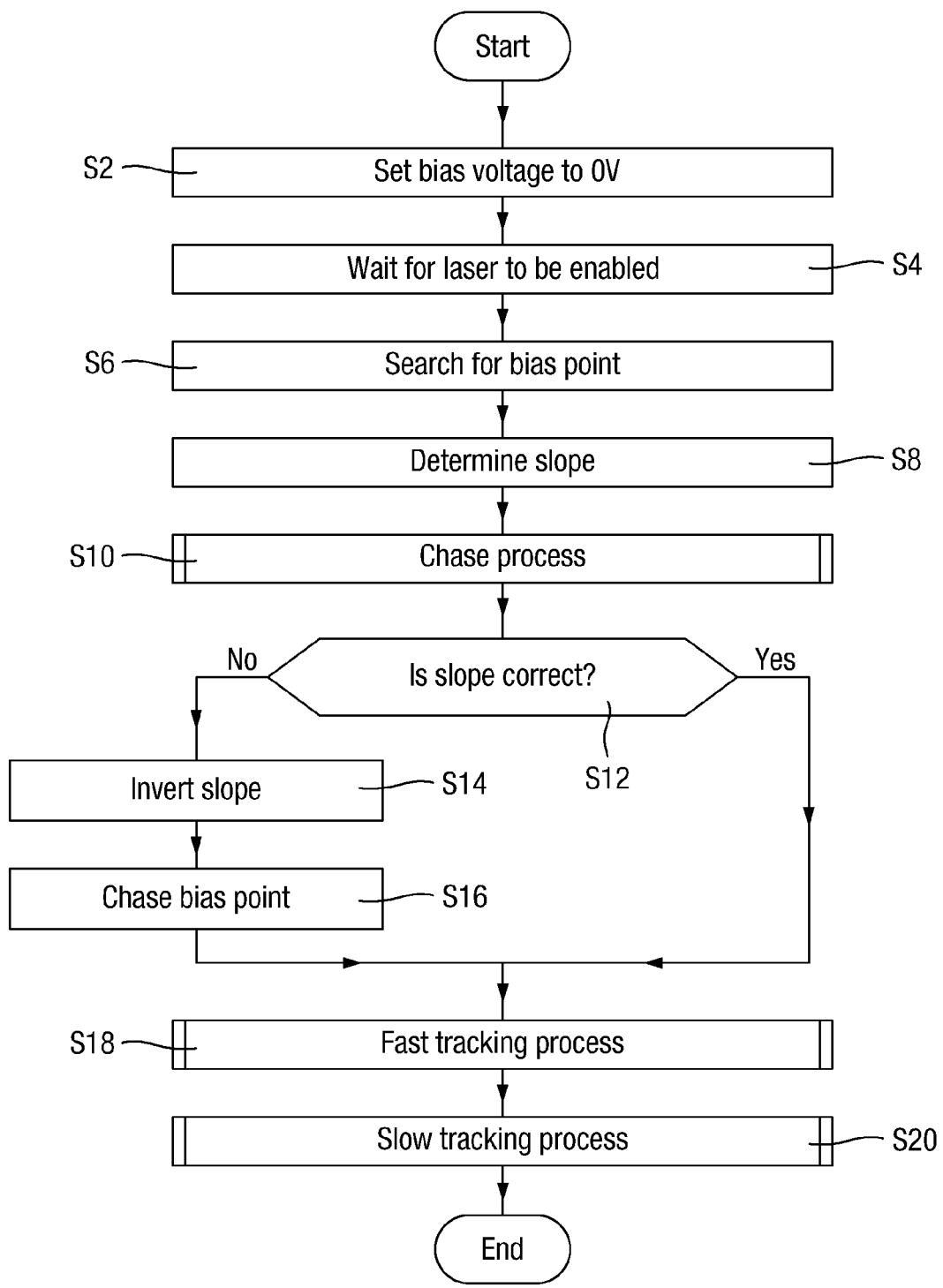
FIG. 5 is a process flow chart showing certain steps of an embodiment of a control algorithm.

FIG. 5 is a process flow chart showing certain steps of an embodiment of the control algorithm performed by the processor 14 to set and/or adjust the bias voltage applied to the modulator.

At step s2, the processor 14 sets bias voltage of the modulator to 0V.

At step s4, the processor 14 waits for the laser to be enabled, i.e. turned on, and for the laser to stabilise. For example, waiting for the laser to stabilise may be achieved by the processor 14 in the first network 100 by waiting a predetermined amount of time. Also for example, in the second network 101, the processor may be sent one or more signals (from the laser controller) indicating that the laser has been enabled and/or that the laser power has stabilised.

At step s6, the processor 14 searches for the bias point of the modulator that is closest to 0V. In this embodiment, this is performed by the processor 14 sweeping the bias voltage of the modulator in a zigzag fashion, starting at 0V with gradually increasing amplitude.

In this embodiment, the bias voltage of the modulator is swept in a zigzag fashion with gradually increasing amplitude. In other embodiments, this search for a bias point may be performed in a different way, for example by alternately increasing and decreasing (or decreasing and increasing) the bias function, e.g. with increasing amplitude, in a different pattern (i.e. a pattern other a zigzag). For example, the bias voltage may be swept in the pattern of a sine function that has increasing amplitude in time.

Figure 6:
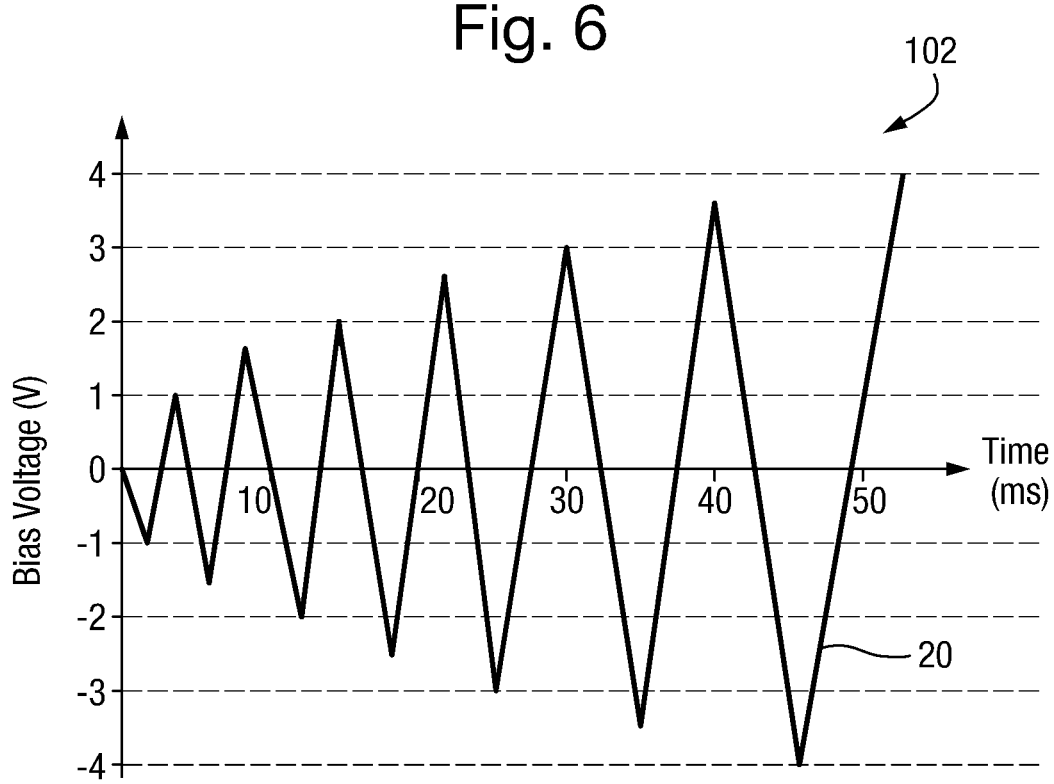
FIG. 6 is a schematic illustration (not to scale) of a graph showing a bias point search.

FIG. 6 is a schematic illustration (not to scale) of a graph 102 showing the bias voltage 20 supplied by the processor 14. The bias voltage 20 is swept in a zigzag fashion, starting at 0V and with gradually increasing amplitude. In this embodiment, the bias voltage 20 of the modulator is swept in this zigzag fashion until the output of the window comparator 10 changes state, i.e. until the window comparator 10 changes from indicating to the processor 14 that the output voltage of the modulator is too low (relative to the target voltage) to indicating to the processor 14 that the output voltage of the modulator is too high (relative to the target voltage). This change of state of the output of the window comparator 10 occurs as the output voltage of the modulator passes the target voltage supplied to the window comparator 10 by the potentiometer 12. Thus, a bias point or quadrature point of the modulator is located.

At step s8, the direction/slope (i.e. positive or negative) of the output of the modulator at the bias point is determined by the processor 14. In this embodiment, this is determined by determining whether the output of the window comparator 10 changes from too high to too low (in which case the slope of the graph 102 at the bias point is negative) or from too low to too high (in which case the slope of the graph 102 at the bias point is positive). The determination of the direction of the slope of the modulator output at the bias point advantageously tends to facilitate the tracking of the bias point by the processor 14.

The bias point of the modulator will initially tend to drift, e.g. due to changes in short-term average applied bias voltage. To account for this (relatively rapid) drifting of the bias point, at step s10, the processor 14 performs a so-called "chase" process. This chase process is performed by the processor 14 for a pre-defined period of time (e.g. a period of time that has been empirically determined, e.g. 20 seconds).

Further information regarding the chase process is provided later below with reference to FIG. 7. The process described with reference to FIG. 7 may also be used to perform the later described "fast-tracking" process (performed at step s18) and the later described "slow-tracking" process (performed at step s20). Basically, in this embodiment the chase process comprises continually adjusting (i.e. increasing or decreasing) the bias voltage in relatively large steps over a period of time (e.g. an empirically determined period of time, e.g. 20 seconds). The steps by which the processor 14 adjusts the bias voltage during the chase process are large relative to the steps that the processor 14 adjusts the bias voltage in other bias point tracking processes e.g. the fast-tracking process performed at step s18 and the slow-tracking process performed at step s20 (which processes are described in more detail later below). Also, the chase process comprises adjusting the bias voltage depending upon the output of the window comparator 10. For example, if the window comparator 10 indicates that the output voltage of the modulator is too high, and the processor 14 determines that the slope of the graph 102 is currently positive, then the processor 14 reduces the bias voltage supplied to the modulator by a relatively large amount. Likewise, if the window comparator 10 indicates that the output voltage of the modulator is too low and the processor 14 determines that the slope of the graph 102 is currently positive, then the processor 14 increases the bias voltage supplied to the modulator by a relatively large amount. The relatively large step sizes by which the bias voltage is adjusted during the chase phase, and the duration of the chase phase may be determined empirically. For example, a step size for the chase process may be determined to be approximately 125 mV. Empirically determining the step sizes used during the chase phase, and/or the duration of the chase phase advantageously tends to provide that the process of FIG. 5 may be implemented using any appropriate components, e.g. using a modulator from one or a plurality of different manufacturers.

The output of the modulator may lag behind the bias input by a significant but variable period of time (e.g. 100-500 ms). Thus, it tends to be possible for the processor 14 to miscalculate the bias slope (i.e. the processor 14 may determine the slope of the modulator output at the bias point to be positive when it is actually negative, and vice versa). As a result of this, during the chase process, the processor 14 may "chase" the bias point in the wrong direction. This may occur, for example, if the bias point of the modulator is immediately before a corner of the zigzag portion of the bias voltage 20.

This problem may be solved by performing steps s12 to s16, as described below. Alternatively, this problem may be solved for example by, when sweeping the bias voltage of the modulator (as performed at step s6), maintaining a substantially constant bias voltage for a certain period of time between increasing the bias voltage and decreasing the bias voltage, and between decreasing the bias voltage and increasing the bias voltage. In other words, when the bias voltage is swept in a zigzag fashion, at each corner of the zigzag, the bias voltage may be maintained for a certain amount of time. However, this tends to increase the length of time that it takes to find a bias point.

At step s12, the processor 14 determines whether or not, during the chase process, the output of the window comparator 10 continually changes between being indicative of the output voltage of the modulator being too high and being indicative of the output voltage of the modulator being too low.

If, at step s12, it is determined that the output of the window comparator 10 does continually change between being indicative of the output voltage of the modulator being too high and being indicative of the output voltage of the modulator being too low, it is determined that the slope of the graph 102 (determined at step s8) is correct. In this case, the process of FIG. 5 proceeds to step s18 which will be described in more detail later below after the description of steps s14 and s16.

However, if, at step s12, it is determined that the output of the window comparator 10 does not continually change between being indicative of the output voltage of the modulator being too high and being indicative of the output voltage of the modulator being too low (i.e. the window comparator 10 indicates that the output voltage of the modulator is too low or too high throughout the chase process), it is determined that the slope of the graph 102 (determined at step s8) is incorrect. In this case, the process of FIG. 5 proceeds to step s14.

At step s14, the processor 14 the bias voltage is reverted to the level it had at the start of the chase process, i.e. the processor 14 sets the bias voltage to be equal to the bias voltage at the beginning of the chase process. In other words, if, during the chase process, the bias voltage has been increased, the processor 14 decreases the bias voltage by the amount that it had been increased during the chase process. Likewise, if, during the chase process, the bias voltage has been decreased, the processor 14 increases the bias voltage by the amount that it had been decreased during the chase process. This reversion of the bias voltage to its original level may be performed over a period of time to avoid the application of a step change in voltage to the modulator.

At step s16, the chase process of step s10 is re-performed using the corrected slope of the modulator output at the bias point, i.e. using the opposite slope to that determined at step s8.

Thus, after step s16, the bias point of the modulator has been tracked as it would have been had the correct slope has been determined by the processor 14 at step s8. After step s16, the method proceeds to step s18.

At step s18, after the chase process has been performed for a predetermined period of time, the processor 14 performs a so-called "fast-tracking" process. In this embodiment, the fast-tracking process is the same as the chase process except that the steps by which the processor 14 adjusts the bias voltage during the fast-tracking process are relatively small compared to those used during the chase process. For example, a step size for the fast-tracking process may be empirically determined to be, e.g., approximately 4 mV. Empirically determining the step sizes used during the fast-tracking process phase, and/or the duration of the fast-tracking process phase advantageously tends to provide that the process of FIG. 5 may be implemented using any appropriate components, e.g. using parts from a variety of different manufacturers.

Further information regarding the fast-tracking process is provided below with reference to FIG. 7. The process described with reference to FIG. 7 may also be used for the chase process (performed at step s10) and the later described slow-tracking process (performed at step s20)

Basically, in this embodiment, the fast-tracking process comprises continually adjusting (i.e. increasing or decreasing) the bias voltage in relatively small steps over a period of time (e.g. an empirically determined period of time, e.g. 2 minutes) and depending upon the output of the window comparator 10. The period of time for which the fast-tracking process is performed may be the same as or different to the period of time for which the chase process is performed.

At step s20, after the fast-tracking process has been performed for a predetermined period of time, the processor 14 performs a so-called "slow-tracking" process. In this embodiment, the slow-tracking process is the same as the fast-tracking and chase processes except that the steps by which the processor 14 adjusts the bias voltage during the slow-tracking process are relatively small compared to those used during the fast-tracking and chase processes. For example, a step size for the slow-tracking process may be empirically determined to be, e.g., approximately 2 mV. Empirically determining the step sizes used during the slow-tracking process phase advantageously tends to provide that the process of FIG. 5 may be implemented using any appropriate components, e.g. using parts from a variety of different manufacturers. The slow-tracking process may be performed for as long as desired e.g. for as long as the system remains operational.

Further information regarding the slow-tracking is provided later below with reference to FIG. 7. The process described with reference to FIG. 7 may also be used for the chase process (performed at step s10) and the fast-tracking process (performed at step s18).

Basically, in this embodiment, the slow-tracking process comprises continually adjusting (i.e. increasing or decreasing) the bias voltage in relatively small steps over a period of time (e.g. whilst the laser is enabled or switched on) and depending upon the output of the window comparator 10. During the slow-tracking process, the window comparator 10 tends to only occasionally report that the bias condition of the modulator is too high or too low, if at all. In other words, during the slow-tracking process and for the majority of the slow-tracking process, the output of the window comparator 10 tends to indicative that the output voltage of the modulator is adequate.

Thus, an embodiment of the control algorithm performed by the processor 14 to set and/or adjust the bias voltage applied to the modulator is provided.

FIG. 7 is a process flow chart of an example tracking or chase process. The process of FIG. 7 may be used to perform the chase process (performed at step s10 of FIG. 5), the fast-tracking process (performed at step s18 of FIG. 5), and/or the slow-tracking process (performed at step s20 of FIG. 5).

In this embodiment, the process of FIG. 7 is performed by the processor 14.

At step s22, the processor 14 receives the latest output of the window comparator 10. The received output of the window comparator 10 is an indication as to whether the output voltage of the modulator is too high, too low, or acceptable relative to the target voltage.

At step s24, the processor 14 determines whether the output voltage of the modulator is too high, too low, or acceptable relative to the target voltage.

If, at step s24, the output voltage of the modulator is too high, the method proceeds to step s26.

If, at step s24, the output voltage of the modulator is too high, the method proceeds to step s28.

In this embodiment, if, at step s24, the output voltage of the modulator is neither too high nor too low (i.e. the output voltage of the modulator is acceptable relative to the target voltage) no action is taken and the processor 14 waits to receive the next output of the window comparator 10 (i.e. in effect, the method proceeds back to step s22).

At step s26, it is determined whether the direction/slope of the graph 102 of the bias voltage 20 at the bias point (as determined at step s8 above) is positive or negative.

If, at step s26, it is determined that the slope of the graph 102 at the bias point is positive, the method proceeds to step s30.

If, at step s26, it is determined that the slope of the graph 102 at the bias point is negative, the method proceeds to step s32.

At step s28, it is determined whether the direction/slope of the graph 102 of the bias voltage 20 at the bias point (as determined at step s8 above) is positive or negative.

If, at step s28, it is determined that the slope of the graph 102 at the bias point is negative, the method proceeds to step s30.

If, at step s28, it is determined that the slope of the graph 102 at the bias point is positive, the method proceeds to step s32.

At step s30, the processor 14 decreases the bias voltage supplied to the modulator.

For the chase process of step s8 of FIG. 5, the processor 14 decreases the bias voltage by a relatively large amount, i.e. the bias voltage is decreased by a relatively large step. The steps by which the processor 14 decreases the bias voltage during the chase process are large relative to the steps that the processor 14 adjusts the bias voltage during the fast-tracking and slow-tracking processes.

For the fast-tracking process of step s18 of FIG. 5, the processor 14 decreases the bias voltage by an amount that is relatively small compared to the steps by which the processor 14 adjusts the bias voltage during the chase process, and that is relatively large compared to the steps that the processor 14 adjusts the bias voltage during the slow-tracking process.

For the slow-tracking process of step s20 of FIG. 5, the processor 14 decreases the bias voltage by a relatively small amount, i.e. the bias voltage is decreased by a relatively small step. The steps by which the processor 14 decreases the bias voltage during the slow-tracking process are small relative to the steps that the processor 14 adjusts the bias voltage during the fast-tracking and chase processes.

After step s30, the method of FIG. 7 proceeds to step s34.

At step s32, the processor 14 increases the bias voltage supplied to the modulator.

If the chase process of step s8 of FIG. 5 is being performed, the processor 14 increases the bias voltage by a relatively large amount, i.e. the bias voltage is increased by a relatively large step. The steps by which the processor 14 increases the bias voltage during the chase process are large relative to the steps that the processor 14 adjusts the bias voltage during the fast-tracking and slow-tracking processes.

If the fast-tracking process of step s18 of FIG. 5 is being performed, the processor 14 increases the bias voltage by an amount that is relatively small compared to the steps by which the processor 14 adjusts the bias voltage during the chase process, and that are relatively large compared to the steps that the processor 14 adjusts the bias voltage during the slow-tracking process.

If the slow-tracking process of step s20 of FIG. 5 is being performed, the processor 14 increases the bias voltage by a relatively small amount, i.e. the bias voltage is decreased by a relatively small step. The steps by which the processor 14 increases the bias voltage during the slow-tracking process are small relative to the steps that the processor 14 adjusts the bias voltage during the fast-tracking and chase processes.

After step s32, the method of FIG. 7 proceeds to step s34.

At step s34, the processor 14 waits a predetermined amount of time (e.g. that may be determined empirically) to allow for the modulator to adjust to the increased/decreased bias voltage.

At step s36, it is determined whether or not the time period for which the tracking or chase process of FIG. 7 is to be performed has elapsed. In other words, it is determined whether the process of FIG. 7 should end.

If, at step s36, it is determined that the time period for which the tracking or chase process of FIG. 7 is to be performed has elapsed, the method ends.

However, if, at step s36, it is determined that the time period for which the tracking or chase process of FIG. 7 is to be performed has not elapsed, the method returns to step s22, at which point a new output is received by the processor 14 from the window comparator 10.

In other embodiments, the tracking or chase process of FIG. 7 may be performed continuously, and the bias point step size may be adjusted e.g. on a timer.

Thus, an example tracking or chase process that may be performed at any or all of steps s10, s18, and s20 of FIG. 5 is provided.

It should be noted that certain of the process steps depicted in the flowcharts of FIGS. 5 and 7 and described above may be omitted or such process steps may be performed in differing order to that presented above and shown in FIGS. 5 and 7. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, at step s6, the processor searches for the bias point closest to 0V by sweeping the bias voltage of the modulator in a zigzag fashion, starting at 0V and with gradually increasing amplitude. In the above embodiments, a symmetric zigzag sweep (such as that shown in FIG. 6) is used. For example, the corners of a symmetric zigzag sweep may be: −1V, +1V, −1.5V, +1.5V, −2V, +2V etc. However, in other embodiments, the processor searches for the bias point closest to 0V using a different search pattern. For example, the processor may search for the bias point closest to 0V using an asymmetric zigzag sweep.

Figure 8:
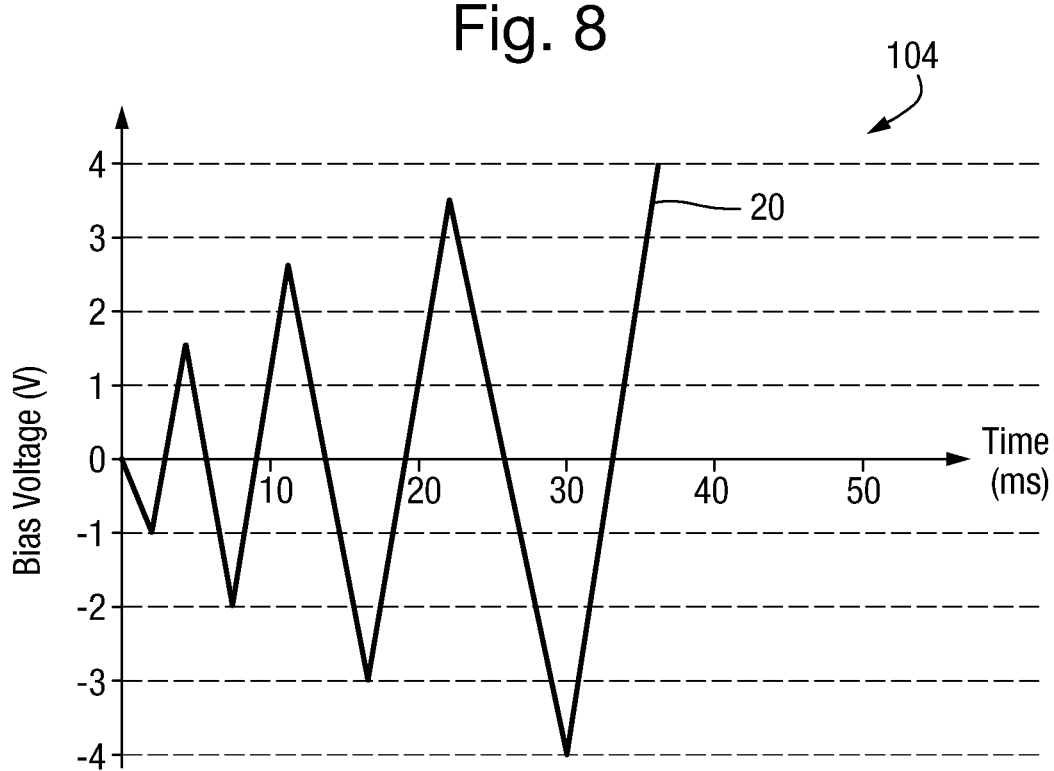
FIG. 8 is a schematic illustration (not to scale) of a further graph showing a bias point search.

FIG. 8 is a schematic illustration (not to scale) of a further graph 104 showing the bias voltage 20 that may be supplied by the processor 14 when searching for the bias point closest to 0V using an asymmetric zigzag sweep. For example, the corners of an asymmetric zigzag sweep may be: −1V, +1.5V, −2V, +2.5V, −3V, +3.5V etc. Preferably, a magnitude increment of +0.5V per corner of the asymmetric zigzag sweep is used. However, any appropriate increment may be used. An asymmetric zigzag sweep tends to be more efficient than a symmetric zigzag sweep. The number of corners that a zigzag sweep comprises may advantageously be selected to provide a desired balance between the speed with which a bias point is found and the location of the bias point closest to 0V.

In the above embodiments, the bias voltage is applied to the modulator by the processor via the DAC and the amplifier. Additionally, the DAC may be used to control the bias range (i.e. the voltage range of the bias voltage). The amplifier may act so as to increase the overall amplitude of the voltage output by the DAC. The amplifier may also act so as to offset the output of the DAC so that the DAC mid-scale is at approximately 0V. For example, the DAC may have an output range of 0 to 0.5V. With such a DAC, an amplifier gain of ×8 and input offset of −0.25V may yield an output range of approximately −4V to +4V.

Optionally, if the bias voltage output by the processor lies outside the bias range defined by the DAC, the bias controller may perform one or more appropriate actions.

For example, if the bias range (defined by the DAC) is exceeded (or an extreme of the bias range is reached) during the process of searching for the bias point closest to 0V, the bias voltage may be reset to 0V and the search process may be restarted.

Also for example, if the bias range (defined by the DAC) is exceeded (or an extreme of the bias range is reached) during the fast-tracking process, the bias voltage may be reset to 0V and the control algorithm may be restarted.

Also for example, if the bias range (defined by the DAC) is exceeded (or an extreme of the bias range is reached) during the slow-tracking process, a host system (e.g. such as that that may be connected to the processor as described above) may be notified of the situation, and the bias controller may maintain the bias voltage at the extreme of the bias range. This extreme bias voltage may be maintained, e.g., until either: (i) the host system instructs the bias controller to reset the bias voltage to its initial value (e.g. to 0V); (ii) the bias point drifts back into the bias range; or (iii) a pre-defined time period elapses, at which point the bias controller resets the bias voltage to its initial value. In this case, the extreme bias voltage would tend to result from bias point drift over an extended period of operation, and so dwelling at a bias point extreme may be an acceptable option.

In other words, during the process of searching for, or tracking, a bias point, the bias voltage may be confined to being within the bias range.

Optionally, the bias controller may warn the host system when the bias voltage is close to its limits (i.e. close to moving outside the bias range). This would advantageously tend to allow the host system to schedule a reset of the bias voltage to its initial value, before such a reset becomes essential.

A bias voltage may be generated using a digital counter or accumulator. Such devices are capable of 'wrapping round', e.g. 4095+1=0 and 0−1=4095. This may result in oscillation between two bias voltage extremes. This problem advantageously tends to be solved by confining the bias range as described above.

In some embodiments, if the laser is disabled (i.e. turned off), the bias controller performs an action that is dependent upon the stability history of the modulator. For example, if the laser is disabled, the process of FIG. 9 may be performed.

FIG. 9 is a process flow chart showing certain steps of a process that may be performed by the bias controller 4 if the laser is disabled, e.g. during normal operation.

At step s40, it is determined for how long the modulator has operated at (or proximate to) its bias point between the laser being enabled and the laser being disabled. In other words, it is determined for how long the bias point of the modulator had been held. This may be performed, for example, by the processor 14 of the bias controller 4.

If, at step s40, it is determined that the modulator has operated at (or proximate to) its bias point for one hour or longer, the bias point of the modulator may be referred to as an "established bias point" for the modulator and the method proceeds to step s42. In other embodiments, a different range of time (i.e. different to the one hour or longer range) may be used instead of the one hour or longer time range.

If, at step s40, it is determined that the modulator has operated at (or proximate to) its bias point for between 10 minutes and one hour, the bias point of the modulator may be referred to as a "recently acquired bias point" for the modulator, and the method proceeds to step s44. In other embodiments, a different range of time (i.e. different to the between 10 minutes and one hour range) may be used instead of the between 10 minutes and one hour time range.

If, at step s40, it is determined that the modulator has operated at (or proximate to) its bias point for 10 minutes or less, the bias point of the modulator may be referred to as a "just acquired bias point" for the modulator, and the method proceeds to step s46. In other embodiments, a different range of time (i.e. different to the 10 minutes or less range) may be used instead of the 10 minutes or less time range.

At step s42, the bias controller 4 operates so as to maintain the bias voltage supplied to the modulator for a relatively long period of time. The period of time is long relative to the period of time that the bias voltage would be maintained for at step s44. In this embodiment, this relatively long period of time is 10 minutes. However, in other embodiments, this long period of time is a different period of time. If the laser is not re-enabled within this long period of time, the bias controller 4 operates so as to reset the bias voltage supplied to the modulator (i.e. return the bias voltage to 0V).

In this case, the modulator has been operating at an established bias point for a relatively long period of time (i.e. an hour or more). When the laser is disabled the bias voltage for the laser is maintained for a relatively long period of time (i.e. 10 minutes). If the laser is subsequently re-enabled in this 10 minute period, it tends to be likely that the bias point for the modulator will be at or close to the position of the bias point when the laser was disabled. Thus, maintaining the bias voltage for the modulator for a relatively long period of time tends to result in quicker availability of the modulator output, and less disturbance of the modulator. This tends to minimise or reduce future drift of the modulator bias point.

At step s44, the bias controller 4 operates so as to maintain the bias voltage supplied to the modulator for a relatively short period of time. The period of time is short relative to the period of time that the bias voltage would be maintained for at step s42. In this embodiment, this relatively short period of time is 10 seconds. However, in other embodiments, this short period of time is a different period of time. If the laser is not re-enabled within this short period of time, the bias controller 4 operates so as to reset the bias voltage supplied to the modulator (i.e. return the bias voltage to 0V). In other embodiments, the bias voltage may be reset to a different value.

In this case, the modulator has been operating at a recently acquired bias point for a relatively short period of time (e.g. between 10 minutes and an hour). This bias point tends not to be as stable as it would be if the modulator has been operating at that bias point for over an hour. When the laser is disabled the bias voltage for the laser is maintained for a relatively short period of time (e.g. 10 seconds). If the laser is subsequently re-enabled in this 10 second period, it tends to be likely that the bias point for the modulator will be at or close to the position of the bias point when the laser was disabled. Thus, maintaining the bias voltage for the modulator for a relatively short period of time tends to result in quicker availability of the modulator output, and less disturbance of the modulator. This tends to minimise or reduce future drift of the modulator bias point.

At step s46, the bias controller 4 operates so as to reset the bias voltage supplied to the modulator (i.e. return the bias voltage to 0V). In other embodiments, the bias voltage may be reset to a different value.

In this case, the modulator has been operating at a just acquired bias point for a short period of time (i.e. 10 minutes or less). This bias point tends not to be particularly stable and so the bias voltage is not maintained.

Thus, a process that may be performed by the bias controller if the laser is disabled is provided. In this embodiment, the bias controller 4 performs an action depending upon the stability history of the modulator. The hold time for the bias voltage (i.e. whether the bias voltage is maintained for a relatively long time, a relatively short time, or reset) is dependent upon the length of time for which the modulator had operated at a bias point. However, in other embodiments, the hold time for the bias voltage is dependent upon one or more different criteria instead of or in addition to being dependent upon the length of time for which the modulator had operated at a bias point. For example, the hold time could also be selected dependent upon a recent rate of change of the bias voltage. Also, the hold time may be selected dependent upon recent changes in temperature of the modulator.

In the above embodiments, once the bias point has been tracked (e.g. using the slow tracking process as described above with reference to step s20 of FIG. 5) for an extended period of time, this bias point tends to be stable. Thus, changes to the supplied bias voltage may occur during the slow-tracking process. However, in other embodiments, once a bias point is stable, the bias voltage is only adjusted when the bias controller is instructed to do so, e.g. by the host system.

In the above embodiments, when the laser is initially enabled (i.e. switched on), the output power of the laser may initially vary (e.g. for a few seconds after the laser has been enabled). As a result, the output of the modulator may vary. The bias controller may attempt to track this variation in the modulator output. However, in other embodiments, changes to the bias voltage are not permitted during the first few seconds of laser operation (e.g. if a previous bias point is already being held). This may be achieved, for example, in the above described second embodiment by the processor monitoring the signals from the laser controller that are indicative of the state of the laser (i.e. that are indicative of whether the laser is enabled or disabled). In other embodiments, the laser power may be monitored at the input to the modulator (e.g. either by means of an analogue-to-digital converter or a differentiator circuit), and bias point adjustment is only permitted when the laser power is determined to be stable.

In the above embodiments, the window comparator is configured to allow small errors in the setting of the bias point of the modulator. This advantageously tends to reduce or eliminate a need to continuously adjust the bias voltage of the modulator. Such continuous adjustment of the bias voltage supplied to the modulator may detrimentally affect the performance of the system. The configuration of the window comparator to allow small errors in the setting of the bias point may be using a standard operational amplifier ("op-amp") circuit in which a threshold for the modulator output being "too high" (relative to the target voltage) is set a relatively small distance above that for the modulator output being "too low". In other words, there may be a "window" between thresholds for modulator output being "too high" and "too low". This relatively small distance, or window, may, for example, be approximately 2% of the expected output power at quadrature. This advantageously tends to provide for the effective tracking of a bias point, e.g. when the modulator output is a fast-moving signal. In other embodiments, the window between the thresholds for the modulator output being "too high and "too low" may be a different size. The size of this window may be advantageously selected to achieve a balance between a level of bias point error and the performance impact of unnecessary bias voltage adjustment. The size of this window may be fixed or variable. Furthermore, the size of this window may be set empirically e.g. to attempt to optimise system performance. In other embodiments, the window comparator may be replaced with an analogue-to-digital converter (ADC). The determination of whether the modulator output is "too high" or "too low" relative to the target voltage may be performed using software. Use of such an ADC tends to be particularly beneficial in embodiments in which the processor is a microcontroller because microcontrollers typically have integral ADCs. Digitising the determination of whether the modulator output is "too high" or "too low" relative to the target voltage advantageously tends to allow for more sophisticated chasing and tracking of a bias point to be performed using a conventional control algorithm e.g. a proportional+integral+derivative (PID) controller.

An advantage provided by the above described system and methods is that the stability of the bias point of the modulator tends to be improved. The advantage tends to be provided by keeping the bias point as close to 0V as possible. Also, the advantage tends to be provided by substantially minimising or reducing the amount of voltage change that the modulator is exposed to.

The above provided systems and methods do not implement a pilot tone or dither frequency and therefore tend not to suffer from the above mentioned disadvantages associated with such features.

The bias point of the modulator may tend to drift over time. This may be due to a combination of factors. For example, changes in temperature may cause the bias point to drift. Also for example, electro-mechanical effects (e.g. mechanical stresses to the modulator chip introduced by the application of voltage to its piezo-electric substrate) may cause the bias point to drift. Also for example, bias voltages may drift away from 0V over time due to trapped charge domains on the surface of the modulator. Also for example, due to realignment of trapped charges, any step change in bias voltage may result in a period of bias point drift.

As modulators tend to respond relatively slowly, the above described control algorithm tends not to have to be run particularly quickly. For example, the control algorithm may be run at a speed of 8 updates per second. Thus, advantageously, there tends not to be a need for either a high speed or high quality clock for running the above described control algorithm. Thus, it tends to be possible to implement the control algorithm using, e.g., on-chip oscillators of low cost microcontrollers or a resistor programmable oscillator running at, for example, 50 KHz. Advantageously, this tends to results in relatively low power consumption and reduced digital noise.

Advantageously, it tends to be possible to reduce or minimise a risk of signature or signal corruption by running the above described circuit at a very low clock rate. Furthermore, the risk of signature or signal corruption may also be reduced or minimised by only communicating with the DAC when a new output value (i.e. bias voltage) is to be supplied to the modulator.

The processing load of the control algorithm tends to be low. Thus, it tends to be possible for multiple modulators to share the same processor. This advantageously tends to reduce the hardware requirements of a multi-channel system.

Advantageously, it tends to be possible to temporarily fix (i.e. lock or hold) the bias voltage (i.e. to maintain the bias voltage at a certain value). This may be performed by the processor, e.g. in response to an instruction from the host system. This feature tends to be useful during self-calibration processes as it tends to prevent the addition of phase/amplitude errors in the output of the modulator.

The above described system and method advantageously tends to avoid the need for a look-up table, or a search for a peak modulator output. The relatively simple control hardware sets the bias point with a potentiometer and monitors the bias point with a window detector. Furthermore, the simplified hardware advantageously tends to make the acquisition of the operating bias point substantially faster than is conventionally possible. For example, an operating bias point can be found in approximately 2-10 seconds using the above described system and methods, as opposed to 30 s to several minutes that tends to be required by conventional apparatus and processes.

In the above provided system and apparatus, the output power of the modulator may be measured from the modulator's dump port (i.e. a second arm of the output coupler). This advantageously tends to maximise the output power of the modulator that is available to the host system. In addition, the monitoring photodiode may be integrated into the modulator package rather than using an external optical tap.

The above described system and methods advantageously tend to provide for the faster acquisition of the bias point. Also, the above described system and methods advantageously tend to provide for the reduction or minimisation of bias point drift. Also, the above described system and methods advantageously tend to provide for the graceful (i.e. controlled) degradation of performance when the extreme of the bias control range is reached. It tends to be possible to avoid this degradation altogether e.g. by warning the host system when the extreme of the bias control range is being approached so that the host system can schedule a reset of the modulator.

The above described methods are advantageously simple. Firstly, a target output power, corresponding to quadrature bias is set. Secondly, when the laser is switched on and its output is stable, the search for a bias point commences. A bias point is found by matching the output from the modulator to the set target output power by adjusting the bias voltage. The bias point closest to 0V is located. This bias point tends to have the minimum potential to drift. This bias point is found by sweeping the bias voltage in a gradually increasing zigzag centred about 0V until the target power is reached. The found bias point is then tracked. Should the bias voltage approach the limit of a control range whilst being tracked, the system may be reset, i.e. the bias voltage may be returned to zero and the search for a bias point may be restarted. The host system may be warned, and allowed to select when the reset actually happens (to prevent loss of service during critical operations). Should the bias voltage reach the limit of the control range, the bias voltage may be held (i.e. fixed or maintained at the extreme value), thereby allowing the RF performance of the system to gradually degrade. The host system may be notified that the bias voltage limit has been reached. The host system may be allowed to choose when a reset happens. Should the laser be turned off, the bias voltage may be held at its current value for a defined period of time. This defined time period may be dependent upon how long the bias point of the modulator had been maintained (i.e. how stable the bias point is).

The invention claimed is:

1. A method of controlling a bias voltage supplied to an optical modulator, the modulator being configurable to be biased by application of the bias voltage such that the modulator operates at quadrature, the method comprising:
   providing, or determining that there is present, a stable optical input power to the modulator;
   providing a target for output power of the modulator, the target for the output power of the modulator being an output power corresponding to the modulator operating at quadrature;
   applying, to the modulator, a bias voltage having an initial value of zero volts; and
   thereafter, varying the bias voltage until the value of the bias voltage is the value that is closest to the initial value and that biases the modulator so that the output power of the modulator is within a pre-defined range of the target output power,
   wherein varying the bias voltage comprises, starting at the initial value, sweeping the bias voltage in a zigzag pattern with gradually increasing amplitude.

2. The method according to claim 1, the method further comprising monitoring the output power of the modulator and, if the output power of the modulator is determined to be outside the pre-defined range of the target output power, further varying the value of the bias voltage so as to bring the output power of the modulator back to being within the pre-defined range of the target output power.

3. The method according to claim 2, wherein further varying the value of the bias voltage so as to bring the output power of the modulator back to being within the pre-defined range of the target output power comprises:
   comparing the output power of the modulator to the target output power to determine whether the output power of the modulator is either higher or lower than the pre-defined range of the target output power;
   determining a direction of a slope of the output power of the modulator relative to the applied bias voltage; and
   depending on the determined slope direction and whether the output power of the modulator is either higher or lower than the pre-defined range of the target output power, either increasing or decreasing the bias voltage by a predetermined amount.

4. The method according to claim 3, wherein the predetermined amount that the bias voltage is either increased or decreased by is dependent upon how long the modulator has been operating at quadrature.

5. The method according to claim 3, wherein comparing the output power of the modulator to the target output power is performed using one of:
   a window comparator; and
   an analogue to digital converter and digital processor.

6. The method according to claim 1, wherein varying the bias voltage comprises comparing the output power of the modulator to the target output power to detect when the output power of the modulator is within the pre-defined range of the target output power.

7. The method according to claim 1, wherein the zigzag pattern is an asymmetric zigzag pattern.

8. The method according to claim 1, wherein the output power of the modulator is within a pre-defined range of the target output power if the output power of the modulator is substantially equal to the target output power.

9. The method according to claim 1, wherein the target output power is provided, at least in part, by a potentiometer or a digital-to-analogue converter.

10. The method according to claim 1, wherein varying the bias voltage is performed such that the bias voltage is confined to being within a pre-defined bias voltage range.

11. The method according to claim 1, the method further comprising, if it is determined that an optical input to the optical modulator has been disabled, maintaining the bias voltage at its current level for a pre-determined length of time, the predetermined length of time being dependent upon the length of time that the modulator has been operating at quadrature.

12. A method of controlling a modulating unit for an optical communications system, the modulating unit comprising a laser for generating an optical carrier signal, an optical modulator for modulating the optical carrier signal, the optical modulator being configurable to be biased by application of a bias voltage such that the optical modulator operates at quadrature, the method comprising controlling the bias voltage supplied to the optical modulator using the method of claim 1.

13. A bias controller for an optical modulator, the modulator being configurable to be biased by application of a bias voltage such that the modulator operates at quadrature, the bias controller comprising one or more processors configured to:
   provide, or determine that there is present, a stable optical input power to the modulator;
   provide, for application to the modulator, the bias voltage, the bias voltage having an initial value of zero volts; and
   dependent upon a target for output power of the modulator, vary the bias voltage until the value of the bias voltage is the value that is closest to the initial value and that biases the modulator so that the output power of the modulator is within a pre-defined range of the target output power;
   wherein the target for the output power of the modulator is an output power corresponding to the modulator operating at quadrature,
   wherein varying the bias voltage comprises, starting at the initial value, sweeping the bias voltage in a zigzag pattern with gradually increasing amplitude.

14. A modulating unit for an optical communications system, the unit comprising a laser for generating an optical carrier signal, an optical modulator for modulating the optical carrier signal, and a bias controller according to claim 13 and arranged to control the optical modulator.

15. The bias controller according to claim 13, wherein the one or more processors are further configured to monitor the output power of the modulator and, if the output power of the modulator is determined to be outside the pre-defined range of the target output power, further vary the value of the bias voltage so as to bring the output power of the modulator back to being within the pre-defined range of the target output power.

16. The bias controller according to claim 15, wherein further varying the value of the bias voltage so as to bring the output power of the modulator back to being within the pre-defined range of the target output power comprises:

comparing the output power of the modulator to the target output power to determine whether the output power of the modulator is either higher or lower than the pre-defined range of the target output power;

determining a direction of a slope of the output power of the modulator relative to the applied bias voltage; and depending on the determined slope direction and whether the output power of the modulator is either higher or lower than the pre-defined range of the target output power, either increasing or decreasing the bias voltage by a predetermined amount.

17. The bias controller according to claim 16, wherein comparing the output power of the modulator to the target output power is performed using one of:

a window comparator; and an analogue to digital converter and digital processor.

18. The bias controller according to claim 13, wherein varying the bias voltage comprises comparing the output power of the modulator to the target output power to detect when the output power of the modulator is within the pre-defined range of the target output power.

19. The bias controller according to claim 13, wherein the zigzag pattern is an asymmetric zigzag pattern.

* * * * *